Patented July 2, 1940

2,206,128

UNITED STATES PATENT OFFICE 2,206,128

VAT DYESTUFFS OF THE ANTHRAQUINONE SERIES

Otto Schlichting, Ludwigshafen-on-the-Rhine, Germany, assignor to General Aniline & Film Corporation, a corporation of Delaware No Drawing. Application December 16, 1938,
Serial No. 246,126. In Germany July 8, 1936

8 Claims. (Cl. 260—303)

The present invention relates to vat dyestuffs of the anthraquinone series. This application is a continuation-in-part of my application Ser. No. 152,375 filed July 7, 1937.

I have found that compounds of the anthraquinone series corresponding to the general formula

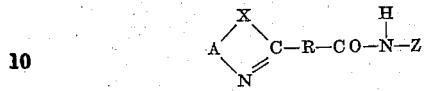

(in which A is the radical of an anthraquinone, X is oxygen, sulphur or an imino group, R is a radical of the benzene series and Z is a radical of the anthraquinone series) are valuable vat dyestuffs.

The said compounds may be obtained by various methods:

(A) For example, they may be prepared by causing anthraquinoneazoles of the structure

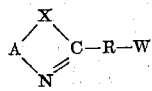

wherein A, X and R have the meanings mentioned above and W stands for a carboxylic acid, carboxylic acid amide, carboxylic acid anhydride or carboxylic acid halide group to react with amino compounds of the anthraquinone series. The anthraquinone azoles may contain the azole ring at any two adjacent positions of the anthraquinone A which latter may contain any desired atoms or groups. The amino compounds of the anthraquinone series employed for this process may contain any atoms or groups, for instance halogen atoms or acylamino groups and they may be derived from anthraquinone, anthrapyrimidine, anthanthrone, pyranthrone, dibenzpyrenequinone, benzanthrone, benzanthraquinone, azanthraquinone, azabenzanthrone, anthrapyridone, anthrapyrimidone, pyrazolanthrone, isothiazolanthrone, anthraquinonebenzacridone or anthraquinonethioxanthrone.

(B) Another method for the preparation of the said compounds consists in causing compounds of the composition

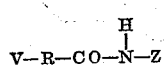

in which R and Z have the meanings mentioned in the second paragraph and V stands for one of the groups —COOH, —CO—halogen, —CHO, —CH(halogen)₂, —C(halogen)₃ or —CONH₂ to react with aminoanthraquinones which allow of the attachment of an azole ring. In this connection there may be mentioned for example aminoanthraquinones containing halogen or a hydroxy, mercapto or amino group in ortho position to the amino group. The preparation of thiazoles may also be carried out by effecting this reaction with aminoanthraquinone while simultaneously or subsequently adding sulphur or sulphurizing agents.

(C) Finally the said compounds may be prepared by causing compounds of the composition V—R—V in which R and V have the meanings mentioned in the second and the foregoing paragraphs respectively, to react simultaneously or subsequently with an aminoanthraquinone which allows of the attachment of an azole ring and with amino compound of the anthraquinone series. As starting material of the composition V—R—V may be mentioned by way of example the halides of the terephthalic acid, the isophthalic acid, the diphenyl-4,4'-dicarboxylic acid and the terphenyl-para-para'-dicarboxylic acid.

The new vat dyestuffs thus obtainable have various shades of color depending on the initial materials. The yields are usually very good and in most cases correspond to the theoretical yields. If necessary the dyestuffs may be purified by usual methods, as for example by crystallisation or by treatment with oxidising agents. They are distinguished by good fastness to light, chlorine and kier boiling.

The following examples will further illustrate how the said invention may be carried out in practice but the invention is not restricted to these examples. The parts are by weight.

Example 1

A mixture of 13 parts of 1-mercapto-2-aminoanthraquinone, 15 parts of 4,4'-diphenyldicarboxylic acid chloride, 1 part of para-toluenesulphonic acid and 150 parts of nitrobenzene is heated while stirring at from 150–160° C. for 1 hour, 150 parts of nitrobenzene and 12 parts of 1-aminoanthraquinone are then added and the whole is boiled for about 2 hours. After cooling to about 100° C. the deposited dyestuff is filtered off by suction, washed with nitrobenzene and methanol and dried. The dyestuff

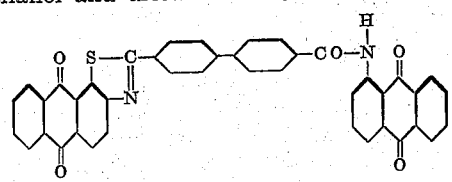

thus obtained is a yellow crystal powder which dissolves in concentrated sulphuric acid giving a yellow coloration, and which dyes from a red-violet vat vegetable fibres greenish yellow shades of good fastness properties.

Similar dyestuffs are obtained when the 1-aminoanthraquinone is replaced by 1-amino-5-benzoylaminoanthraquinone or by 2- or 4- or 5- or 8-amino-1.9-anthrapyrimidine.

Example 2

A mixture of 17 parts of 1-amino-5-benzoylaminoanthraquinone, 15 parts of 4,4'-diphenyldicarboxylic acid chloride and 200 parts of nitrobenzene is heated while stirring at about 150° C. until the chloride of the formula

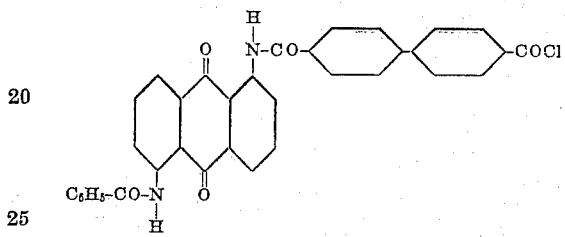

has been formed. Then a mixture of 13 parts of 1-mercapto-2-aminoanthraquinone, 1 part of para-toluenesulphonic acid and 200 parts of nitrobenzene is added and the whole is heated at about 200° C. until initial material is no longer detectable. After cooling to about 100° C. the deposited dyestuff is filtered off by suction, washed with nitrobenzene and methanol and dried. The dyestuff

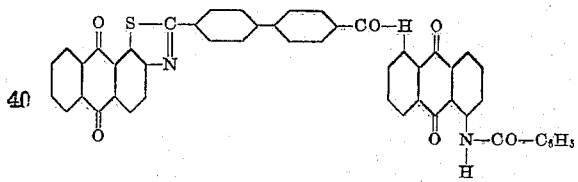

thus obtained in a good yield is a yellow crystal powder which dissolves in concentrated sulphuric acid giving a yellow coloration and which dyes from a red-violet vat cotton yellow shades of good fastness properties.

Similar dyestuffs are obtained when instead of 1-amino-5-benzoylaminoanthraquinone, 1-amino-5-chloranthraquinone or 1-amino-4-methoxyanthraquinone or 1-amino-5-methoxyanthraquinone is used.

Example 3

A mixture of 24 parts of 2-amino-3-hydroxyanthraquinone, 1 part of para-toluenesulphonic acid, 600 parts of nitrobenzene and 47 parts of the chloride of the formula

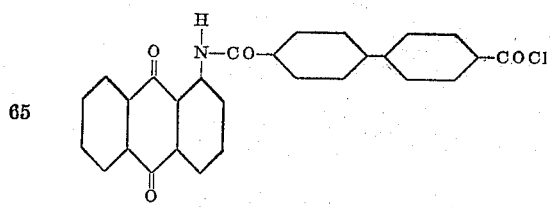

(obtainable by condensation of 1 molecular proportion of 1-amino-anthraquinone with 1 molecular proportion of 4,4'-diphenyldicarboxylic acid chloride in ortho-dichlorbenzene) is boiled while stirring for 2 hours. The deposited dyestuff is worked up in the usual manner. The new dyestuff thus obtained as a yellow crystal powder has the formula

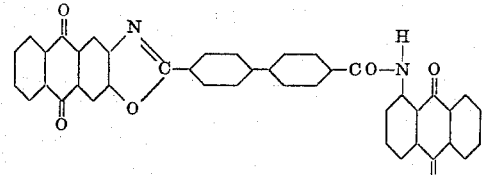

and dissolves in concentrated sulphuric acid giving a yellow coloration and dyes from a red vat cotton yellow shades of good fastness properties.

Corresponding dyestuffs are obtained if 1-amino-2-hydroxyanthraquinone or 1-mercapto-2-aminoanthraquinone be employed instead of 2-amino-3-hydroxyanthraquinone.

Example 4

A mixture of 12 parts of 1-amino-2-hydroxyanthraquinone, 15 parts of 4,4'-diphenyldicarboxylic acid chloride, 1 part of para-toluenesulphonic acid and 150 parts of nitrobenzene is heated while stirring at 180° C. for an hour. A mixture of 18 parts of 1-amino-5-benzoylaminoanthraquinone and 150 parts of nitrobenzene is then added and the whole is boiled for another hour. After working up in the usual manner the dyestuff

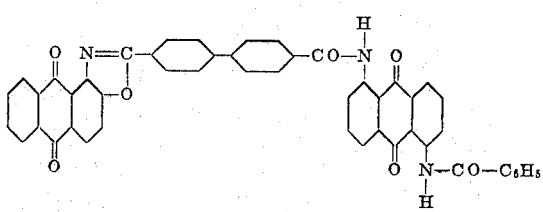

is obtained as an orange colored crystal powder which dissolves in concentrated sulphuric acid giving a yellow-red coloration and which dyes from a red vat vegetable fibres yellow shades of good fastness properties.

If instead of 1-amino-5-benzoylaminoanthraquinone, the 1-aminoanthraquinone is used a dyestuff is obtained which dyes cotton greenish yellow shades. Furthermore good dyestuffs are obtained if 2-[4-aminophenyl-1]-[anthraquinono-1(N).2:4.5-oxazole] or 2-[1.4-diaminoanthraquinonyl-2]-[anthraquinono-2'.3':4.5-oxazole] or 4-amino-5'-chloranthraquinone-1(N).2.2'(N)1'-benzacridone be used instead of 1-amino-5-benzoylaminoanthraquinone.

Example 5

A mixture of 26 parts of 1-mercapto-2-aminoanthraquinone, 25 parts of terephthalic acid chloride and 250 parts of nitrobenzene is heated while stirring at 180° C. for an hour. After adding 150 parts of nitrobenzene and 23 parts of 1-aminoanthraquinone the whole is boiled for an hour. After working up in the usual manner the dyestuff

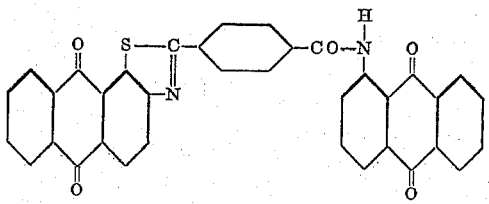

is obtained. By-products may be removed by treatment with hot trichlorbenzene or nitrobenzene or with an alkaline sodium hypochlorite solution or a hot aqueous solution of sodium bichromate. The dyestuff thus purified dissolves in concentrated sulphuric acid giving a yellow coloration and it dyes from a red-violet vat cotton powerful greenish yellow shades of good fastness properties.

Similar dyestuffs are obtained when 1-amino-5-benzoylaminoanthraquinone or 4- or 5-amino-1.9-anthrapyrimidine or 4- or 5-amino-1.9-anthrapyrimidone are used instead of 1-aminoanthraquinone.

Example 6

A mixture of 25 parts of 1-amino-2-hydroxyanthraquinone, 25 parts of terephthalic acid chloride and 250 parts of nitrobenzene is heated while stirring at 180° C. for 2 hours. After adding 150 parts of nitrobenzene and 35 parts of 1-amino-5-benzoylaminoanthraquinone the whole is boiled for 1 hour and worked up in the usual manner. The dyestuff thus obtained

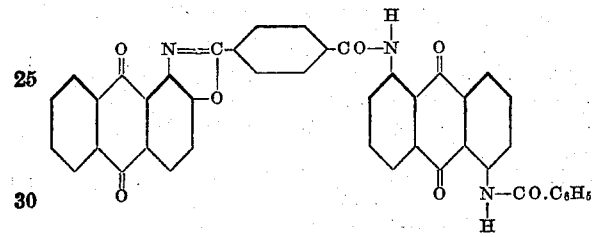

dissolves in concentrated sulphuric acid giving a yellow coloration and dyes cotton yellow shades from a red vat.

Similar dyestuffs are obtained when 2-amino-3-hydroxyanthraquinone or 1.2-diaminoanthraquinone is used instead of 1-amino-2-hydroxyanthraquinone.

Example 7

A mixture of 24 parts of 1.2-diaminoanthraquinone, 1 part of para-toluenesulphonic acid, 500 parts of nitrobenzene and 40 parts of the following chloride

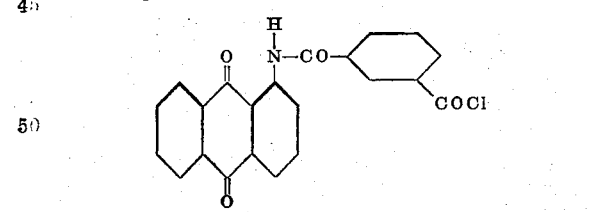

(obtainable by heating 1 molecular proportion of 1-aminoanthraquinone with 1 molecular proportion of isophthalic acid chloride in orthodichlorbenzene) is heated while stirring at 200° C. for about 2 hours. After working up in the usual manner the dyestuff

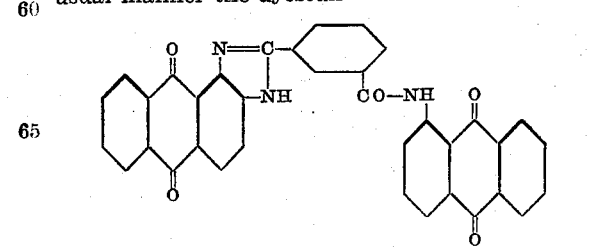

is obtained as a yellow crystal powder which dissolves in concentrated sulphuric acid giving a yellow coloration and which dyes from a red vat cotton greenish yellow shades of good fastness properties.

In a similar manner a reddish yellow dyestuff is obtained when the following chloride

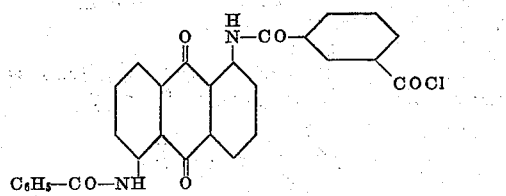

is used instead of the above mentioned chloride.

Example 8

A mixture of 26 parts of 1-mercapto-2-aminoanthraquinone, 23 parts of 1-aminoanthraquinone, 25 parts of isophthalic acid chloride, 1 part of para-toluenesulphonic acid is heated while stirring at 150° C. for an hour and then boiled for about 2 hours. After cooling to about 100° C. the deposited crystal pulp is filtered off by suction, washed with nitrobenzene and methanol and dried. The resulting dyestuff is a yellow powder and probably has the following composition

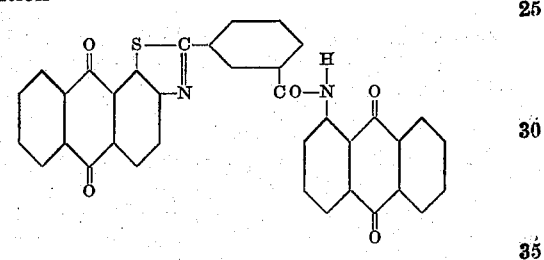

It dissolves in concentrated sulphuric acid giving a yellow coloration and it dyes cotton yellow shades from a red-violet vat.

If para-para'-terphenyldicarboxylic acid chloride instead of isophthalic acid chloride is used there is obtained a similar yellow dyestuff.

Example 9

A mixture of 24 parts of 1-amino-2-hydroxyanthraquinone, 22.5 parts of 1-aminoanthraquinone, 21 parts of isophthalyl chloride, 2 parts of para-toluenesulphonic acid and 400 parts of nitrobenzene is heated to boiling for about 2 hours while stirring. The whole is allowed to cool to from about 60° to 70° C. and the yellow crystal pulp is filtered off by suction and washed with nitrobenzene and methanol. The resulting dyestuff is a yellow powder and probably has the following composition:

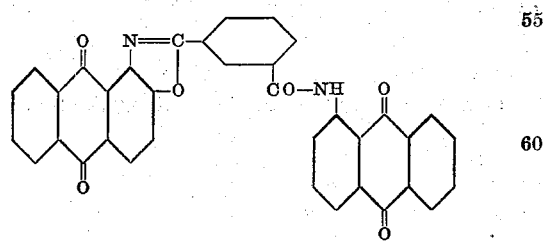

It dyes cotton greenish yellow shades from a violet-tinged red vat.

It may also be prepared by first causing 1 molecular proportion of 1-amino-2-hydroxyanthraquinone to react with 1 molecular proportion of isophthalyl chloride so that one acid chloride group of the isophthalyl chloride is still free, and then treating this acid chloride with 1-aminoanthraquinone, or by causing the C-phenylanthraquinone-1(N).2-oxazole-3'-carboxylic acid (obtainable from 6.3'-methylphenylanthraquinone-1(N).2-oxazole by oxidation with sodium bichromate and sulphuric acid) to react in the form of its acid chloride with 1-aminoanthraquinone.

What I claim is:

1. A vat dyestuff of the anthraquinone series corresponding to the general formula

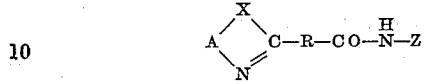

wherein A stands for the radical of an anthraquinone, X for a member selected from the class consisting of $$-O-, -S- \text{ and } -\overset{H}{N}-$$

R for a cyclic radical selected from the class consisting of benzene, diphenyl and terphenyl, and Z for a radical of the anthraquinone series.

2. A vat dyestuff of the anthraquinone series corresponding to the general formula

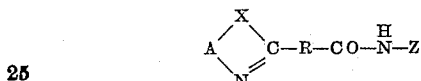

wherein A stands for the radical of the anthraquinone, X for a member selected from the class consisting of $$-O-, -S- \text{ and } -\overset{H}{N}-$$

R for a cyclic radical selected from the class consisting of benzene, diphenyl and terphenyl and Z for a radical of the anthraquinone series.

3. A vat dyestuff of the anthraquinone series corresponding to the general formula

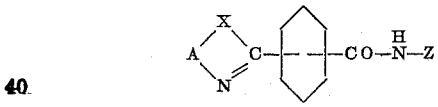

wherein A stands for the radical of the anthraquinone, X for a member selected from the class consisting of $$-O-, -S- \text{ and } -\overset{H}{N}-$$

and Z for a radical of the anthraquinone series.

4. A vat dyestuff of the anthraquinone series corresponding to the general formula

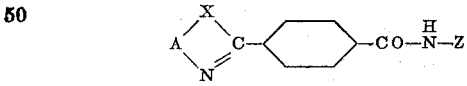

wherein A stands for the radical of the anthraquinone, X for a member selected from the class consisting of $$-O-, -S- \text{ and } -\overset{H}{N}-$$

and Z for a radical of the anthraquinone series.

5. A vat dyestuff of the anthraquinone series corresponding to the general formula

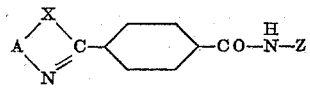

wherein A stands for the radical of the anthraquinone, X for a member selected from the class consisting of $$-O-, -S- \text{ and } -\overset{H}{N}-$$

and Z for an anthraquinone radical combined in the alpha-position to $$-\overset{H}{N}-$$

6. The vat dyestuff of the formula

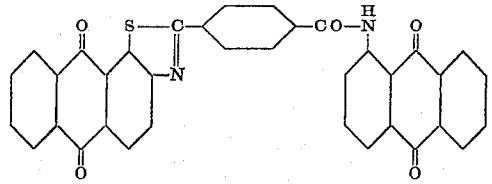

which dissolves in concentrated sulphuric acid giving a yellow coloration and which dyes vegetable fibres greenish yellow shades from a red-violet vat.

7. The vat dyestuff of the formula

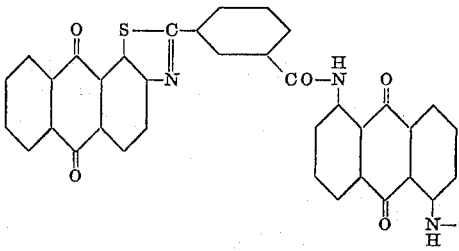

which dissolves in concentrated sulphuric acid giving a yellow coloration and which dyes vegetable fibres yellow shades from a red-violet vat.

8. The vat dyestuff of the formula

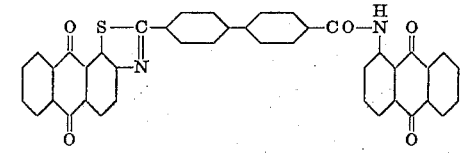

which dissolves in concentrated sulphuric acid giving a yellow coloration and which dyes vegetable fibres yellow shades from a red-violet vat.

OTTO SCHLICHTING.